US 6,705,572 B1

(12) United States Patent
Christopher

(10) Patent No.: US 6,705,572 B1
(45) Date of Patent: Mar. 16, 2004

(54) EMERGENCY LOW ALTITUDE PARACHUTE WHEREIN CANOPY IS DEPLOYED AND INFLATED PRIOR TO USE

(76) Inventor: Karim S Christopher, 36621 Hopewell Rd., Squaw Valley, CA (US) 93675

( * ) Notice: Subject to any disclaimer, the term of this patent is extended or adjusted under 35 U.S.C. 154(b) by 0 days.

(21) Appl. No.: 10/091,252

(22) Filed: Mar. 5, 2002

(51) Int. Cl.[7] .............................................. B64D 17/72
(52) U.S. Cl. ...................... 244/142; 244/147; 244/148; 244/151 R
(58) Field of Search ................ 244/142, 138 R, 244/143, 145, 146, 147, 148, 149, 151 R

(56) References Cited

U.S. PATENT DOCUMENTS

| | | |
|---|---|---|
| 1,854,996 A | 4/1932 | Palagonia |
| 2,656,996 A | 10/1953 | Hovland |
| 2,898,061 A * | 8/1959 | Buhler ................ 244/145 |
| 2,924,409 A | 2/1960 | Burke, Jr. |
| 2,967,685 A | 1/1961 | Magnuson |
| 3,133,718 A | 5/1964 | Stencel |
| 3,193,223 A | 7/1965 | Davis |
| 3,251,566 A | 5/1966 | Chappell |
| 3,447,769 A | 6/1969 | Stencel et al. |
| 3,757,371 A * | 9/1973 | Martin ................ 441/94 |
| 3,759,469 A | 9/1973 | Nimylowycz |
| 3,921,944 A * | 11/1975 | Morrison ........... 244/138 R |
| 4,105,173 A * | 8/1978 | Bucker ............... 244/146 |
| 4,257,568 A * | 3/1981 | Bucker ............... 244/146 |
| 4,355,774 A | 10/1982 | Koenig |
| 4,399,969 A * | 8/1983 | Gargano .............. 244/145 |
| 4,522,639 A * | 6/1985 | Ansite et al. ............ 55/314 |
| 4,699,338 A * | 10/1987 | Penberthy .............. 244/152 |
| 4,793,575 A * | 12/1988 | Butler ................. 244/148 |
| 5,011,100 A * | 4/1991 | Gerstein .............. 244/153 R |
| 5,058,831 A * | 10/1991 | Takahashi ............. 244/142 |
| 5,169,093 A | 12/1992 | Schoffl |
| 5,388,786 A * | 2/1995 | Hirose ............... 244/138 R |
| 6,427,252 B1 * | 8/2002 | Lewis et al. .............. 2/326 |
| 6,487,725 B1 * | 12/2002 | Jordan ................. 2/94 |
| 6,503,119 B1 * | 1/2003 | Lapointe ................ 446/34 |

FOREIGN PATENT DOCUMENTS

| | | | | |
|---|---|---|---|---|
| DE | 3702459 A | * | 8/1988 | ........... A63B/29/00 |
| GB | 2014095 A | * | 8/1979 | ........... B64D/17/40 |

* cited by examiner

Primary Examiner—Charles T. Jordan
Assistant Examiner—Stephen A. Holzen
(74) Attorney, Agent, or Firm—Michael I Kroll

(57) ABSTRACT

The present invention 10 discloses an emergency low altitude parachute having a parachute canopy 28 that inflates by the introduction of compressed gas. A compressed gas canister 30 is located within the housing of the inflatable portion of the device and is activated by an activation ring 24. The device is stored within a carrying case 16 prior to use. When the low altitude emergency parachute 14 is removed from its storage case, the user 12 attaches the attachment harness 32 to their body. A helmet 22 with breathing apparatus is supplied. Once the user 12 is harnessed in, the device is held in the front of the body and an activation ring 24 is provided as means of activating the compressed gas canister 30. Once activated the parachute pontoons fill with the gas rapidly, expanding them and unfolding the parachute canopy 28. The device 10 is then released through the threshold 26 of the escape route. When the parachute 14 has fully deployed, the parachute 14 has sufficient surface air that a user 12 may propel themselves from a low altitude structure without requiring a substantial distance before the parachute canopy 28 is able to support the user's 12 weight.

10 Claims, 9 Drawing Sheets

EMERGENCY LOW ALTITUDE PARACHUTE WHEREIN CANOPY IS DEPLOYED AND INFLATED PRIOR TO USE

BACKGROUND OF THE INVENTION

1. Field of the Invention

The present invention relates generally to parachutes and, more specifically, to emergency low altitude parachutes consisting of a parachute canopy that inflates by the introduction of compressed gas. A compressed gas canister is located within the housing of the inflatable portion of the device and is activated by an activation ring. The device is a self-contained device that is deployed manually by pulling an activation ring which activates a compressed gas canister, inflating the canopy pontoons and expanding the canopy of the parachute. The device is stored within a carrying case prior to use.

When the low altitude emergency parachute is removed from its storage case, the user attaches the shoulder, crotch and waist harness to their body. A helmet with breathing apparatus is supplied. Once the user is harnessed in, the device is held in the front of the body and is ready for deployment. An activation ring is provided as means of activating the compressed gas canister, located within the housing of the parachute. Once activated the parachute pontoons fill with the gas rapidly, expanding them and unfolding the parachute canopy. The device is then released through the threshold of the escape route. When the parachute has fully deployed, the parachute has sufficient surface air that a user may propel themselves from a low altitude without requiring a substantial distance before the canopy is able to support the user's weight. The device is designed for users not familiar with parachute use and avoids the potential of entanglement of the user in the chute cord, which may occur as a body in free-fall rolls uncontrollably.

2. Description of the Prior Art

There are other parachute devices designed for emergency use. Typical of these is U.S. Pat. No. 1,854,996 issued to Palagonia on Apr. 19, 1932.

Another patent was issued to Hovland on Oct. 27, 1953 as U.S. Pat. No. 2,656,996. Yet another U.S. Pat. No. 2,924,409 was issued to Burke Jr. on Feb. 9, 1960 and still yet another was issued on Jan. 10, 1961 to Magnuson as U.S. Pat. No. 2,967,685.

Another patent was issued to Stencel on May 19, 1964 as U.S. Pat. No. 3,133,718. Yet another U.S. Pat. No. 3,193,223 was issued to Davis on Jul. 6, 1965. Another was issued to Chappell on May 17, 1966 as U.S. Pat. No. 3,251,566 and still yet another was issued on Jun. 3, 1969 to Stencel et al. as U.S. Pat. No. 3,447,769.

Another patent was issued to Nimylowycz on Sep. 18, 1973 as U.S. Pat. No. 3,759,469. Yet another U.S. Pat. No. 4,257,568 was issued to Bücker on Mar. 24, 1981 and still yet another was issued on Oct. 26, 1982 to Koenig as U.S. Pat. No. 4,355,774. And another was issued on Dec. 8, 1992 to Schoffl as U.S. Pat. No. 5,169,093.

The invention has for an object the provision of a compressed air parachute characterized by a parachute sail having a transverse plate across its top portion to divide off a small chamber which is connected to a flexible air tube extending along the axis of the parachute sail to the bottom for connection with a supply of air which is capable of straightening out the tube and inflating the small compartment and thus insuring the opening of the parachute.

The present invention relates to parachutes and especially to arrangements and means adapted to provoke and accelerate the opening of a parachutist as he jumps.

The present invention provides a unique parachute construction and assembly which an be effectively and safely utilized at extremely low altitudes which will function effectively to permit safe descent of personnel and equipment from points of fall originating below 300 feet.

This invention relates generally to pilot chute ejection devices and more particularly to ejection devices employing ballistic and mechanical means for launching a pilot chute a sufficient distance from the aircraft to insure its operation.

A deployable parachute, comprising a collapsed parachute canopy; a plurality of suspension lines attached to the periphery of said canopy, and adapted to be attached to a load; a first explosive means independent of the launching source having a first and second member, said first member attached to said canopy and second member attached to said load.

The present invention relates to a parachute release control which may be held in the hand during sky diving prior to releasing the parachute from the pack.

The invention is a bail-out device comprising a collapsed balloon, a canister means at least partly inside the balloon having an opening therein, said opening having edges, lower fastening means on said canister.

A compact gun device for spreading the canopy of a parachute, including a main or central body means and a plurality of telescoping drive assemblies disposed radially about the body means.

A parachute arrangement having a hydraulic parachute spreader positioned internally of the canopy skirt and connected at one end by a lanyard to a load when deployed, such that upon operation of the drogue chute the initiator will ignite a propellant charge in the spreader to eject liquid coolant through peripherally spaced lateral orifices in the spreader sidewall against the skirt to facilitate a quick opening thereof.

The improvement refers to an inflatable device for quick expansion of parachutes for low altitude jumping, comprising elements of bags firmly connected to the canopy and sheathed into by tubes of the expansion structure, as well as lines tied between those bags and tubes, the object of the improvement being to permit a reduction of the dimensions of the expansion structure and to increase its expansion speed.

This is an improvement in circular canopies of the flat, conical, or hemispherical type, some of which have extended skirts with the canopies being of gore construction. External additional gores of porous material cover selected canopy gores and are arranged to insure circular balance of the canopy. Each external gore covering is mounted on radial seams of the canopy gore which it covers beginning at a point above the canopy skirt and extending along the radial seams and across the apex hem to define a compartment for accepting external air flow turbulence existing on the elongated canopy prior to normal inflation. The external gore is closed at the top thereof and incorporates an anti-oscillation vent with the lower end thereof being open and terminating at an elevation of approximately 4 to 14 inches above and in spaced relation to the skirt of the canopy.

A parachute associated with an object unfolds faster in an airstream if the object is first accelerated in the direction of descent. This principle can be applied advantageously to a mine system combating military targets from the air because the time between starting from an ambush position in the terrain to the onset of searching movements in the air can be shortened.

While these parachutes may be suitable for the purposes for which they were designed, they would not be as suitable for the purposes of the present invention, as hereinafter described.

SUMMARY OF THE PRESENT INVENTION

The present invention discloses an emergency low altitude parachute having a parachute canopy that inflates by the introduction of compressed gas. A compressed gas canister is located within the housing of the inflatable portion of the device and is activated by an activation ring. The device is stored within a carrying case prior to use. When the low altitude emergency parachute is removed from its storage case, the user attaches the attachment harness to their body. A helmet with breathing apparatus is supplied. Once the user is harnessed in, the device is held in the front of the body and an activation ring is provided as means of activating the compressed gas canister. Once activated the parachute pontoons fill with the gas rapidly, expanding them and unfolding the parachute canopy. The device is then released through the threshold of the escape route. When the parachute has fully deployed, the parachute has sufficient surface air that a user may propel themselves from a low altitude structure without requiring a substantial distance before the parachute canopy is able to support the user's weight.

A primary object of the present invention is to provide an emergency low altitude parachute.

Another object of the present invention is to provide an emergency low altitude parachute that can be deployed and used from burning buildings during earthquakes and other lofty places.

Yet another object of the present invention is to provide an emergency low altitude parachute that is stored in its own carrying case.

Still yet another object of the present invention is to provide an emergency low altitude parachute that is inflated by pulling an activation ring that activates a compressed gas canister.

Another object of the present invention is to provide an emergency low altitude parachute that consists of a parachute canopy having inflatable pontoons attached to the chute that expand the canopy to an open deployed position.

Yet another object of the present invention is to provide an emergency low altitude parachute that is inflated by a compressed gas that is released from an activated gas canister.

Still yet another object of the present invention is to provide an emergency low altitude parachute that is attached to the users body by means of a harness and is held in front of the body prior to deployment.

Additional objects of the present invention will appear as the description proceeds.

The present invention overcomes the shortcomings of the prior art by providing an emergency low altitude parachute that can be deployed and used from burning buildings during earthquakes and other lofty places when emergency evacuation is necessary. Also to provide an emergency low altitude parachute that is stored in its own carrying case. Also an emergency low altitude parachute that is inflated by pulling an activation ring that activates a compressed gas canister. Also to provide an emergency low altitude parachute that consists of a parachute canopy having inflatable pontoons that expand the canopy to an open deployable position.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
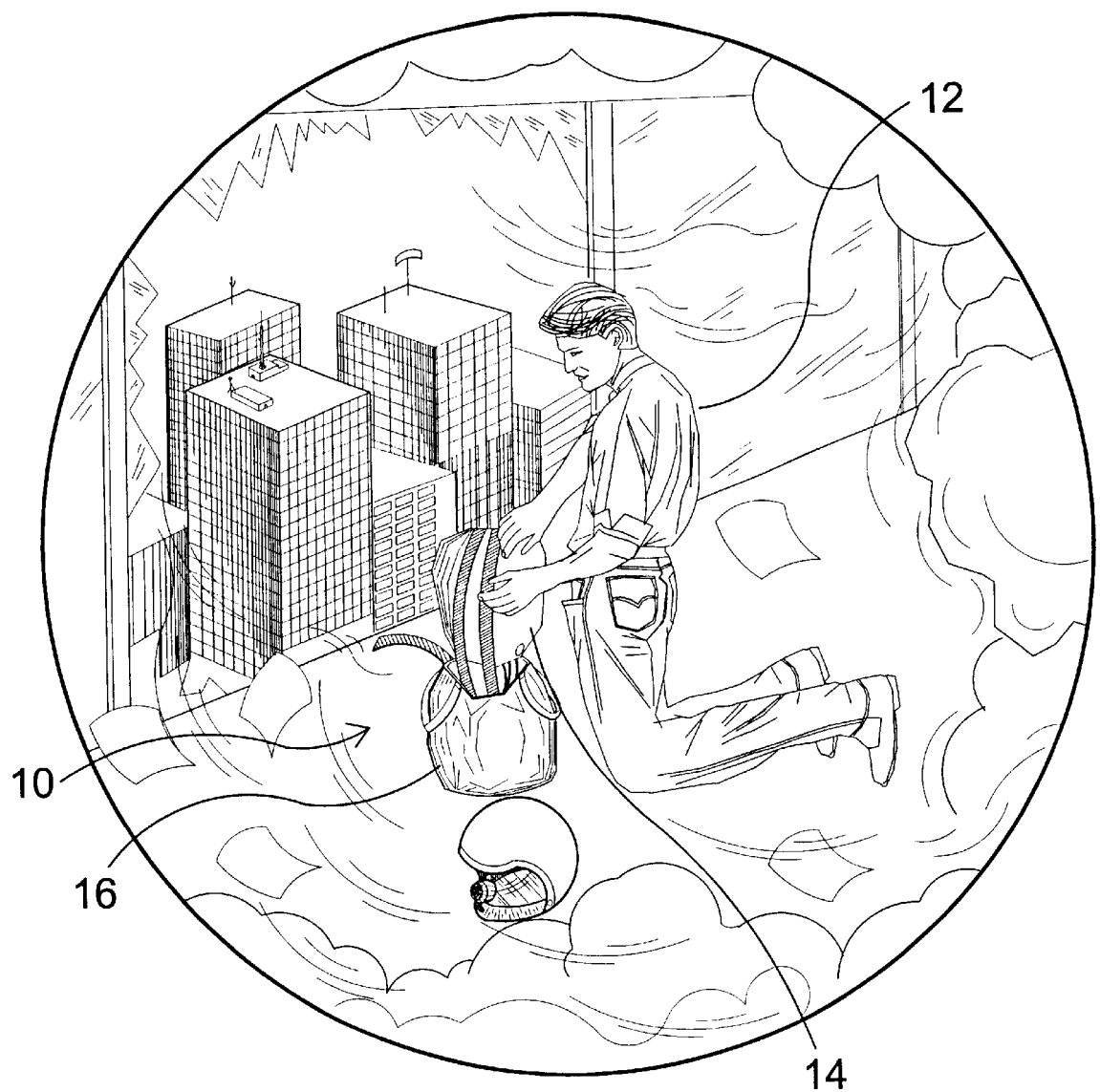
FIG. 1 is an illustrative view of the present invention in use. (Step one)

With regard to reference numerals used, the following numbering is used throughout the drawings.

10 present invention
12 user
14 parachute
16 carrying case
18 shoulder strap
20 waist harness
22 helmet
24 activation ring
26 threshold
28 canopy
29 chute lines
30 gas canister
32 attachment harness
34 flight control rings and straps
36 beacon
38 retaining straps
40 safety buckle

DETAILED DESCRIPTION OF THE PREFERRED EMBODIMENT

The following discussion describes in detail one embodiment of the invention. This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10 in use by a user 12. Step one in the use of the present invention 10 is shown. The present invention 10, discloses a low altitude emergency parachute 14 being a self contained device that is deployed manually by pulling an activation ring and activating a compressed gas canister thereby inflating the canopy pontoons and expanding the housing of the parachute. The device is stored within a carrying case 16 prior to use which requires removal from the case 16, as shown.

Figure 2:
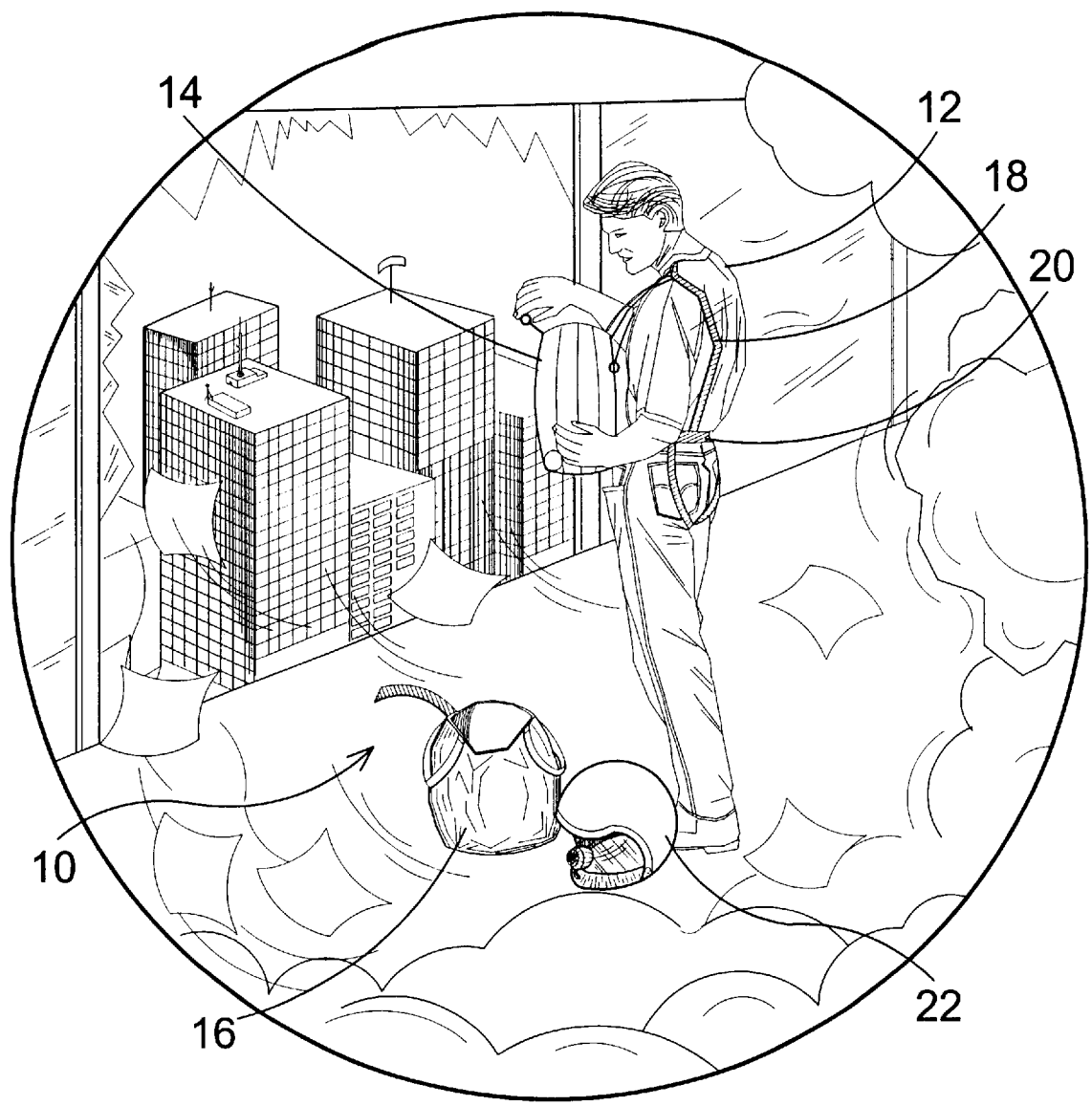
FIG. 2 is an illustrative view of the present invention in use. (Step two)

Turning to FIG. 2, shown therein is an illustrative view of the present invention 10 in use by a user 12. Step two in the use of the present invention 10 is shown. When the low altitude emergency parachute 14 is removed from its storage case 16, the user attaches the shoulder 18 and waist harness 20 to their body. The helmet 22 is placed on the head of user 12. Once the user is harnessed in, the device is held in front of the body and is ready to be deployed.

Figure 3:
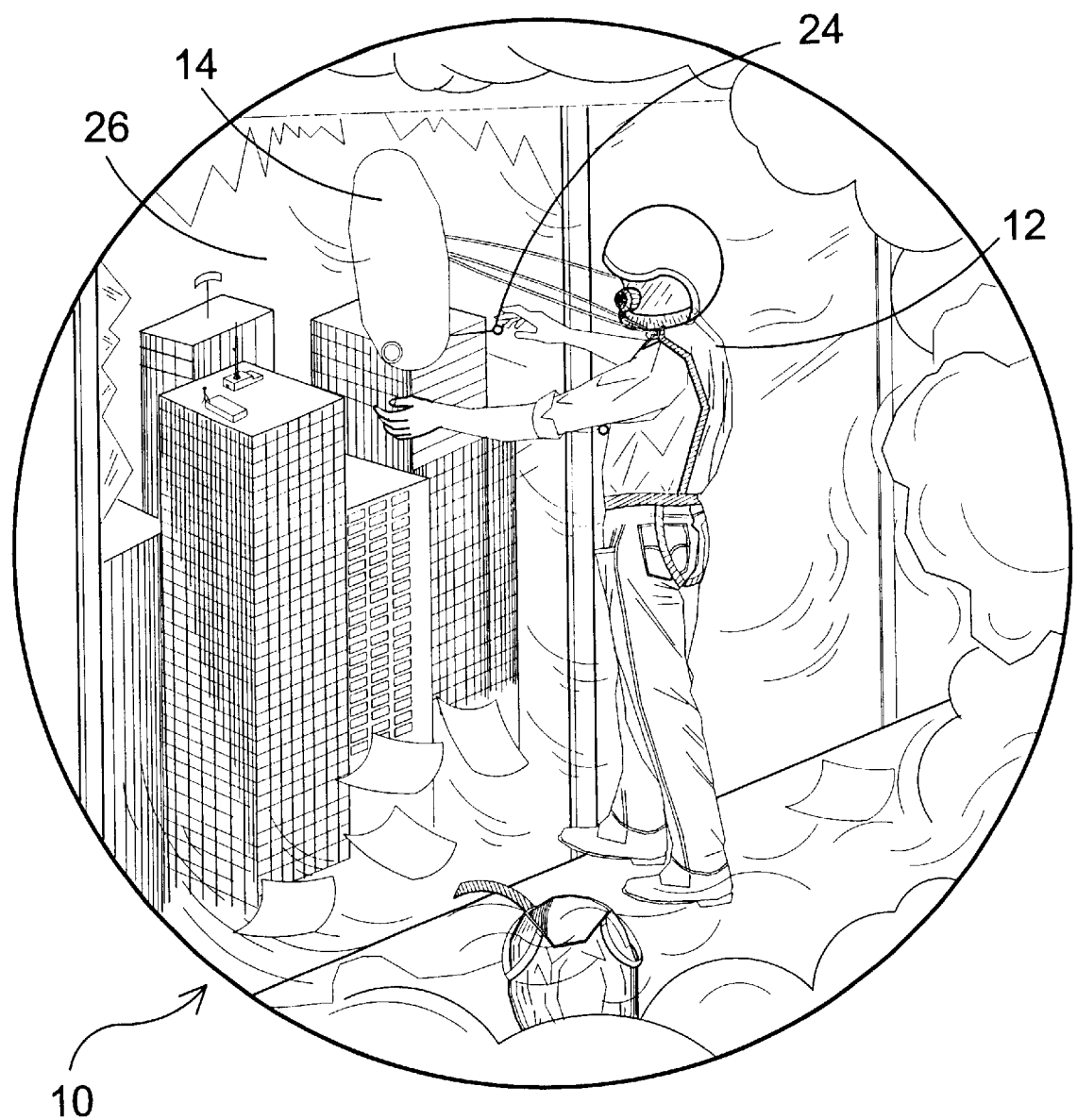
FIG. 3 is an illustrative view of the present invention in use. (Step three)

Turning to FIG. 3, shown therein is an illustrative view of the present invention 10 in use by a user 12. Step three in the use of the present invention 10 is shown. An activation ring 24 is provided as means of activating the compressed gas canister, located within the housing of the parachute 14. Once activated the parachute pontoons fill with the gas rapidly expanding them and unfolding the parachute canopy. The device is then released through the threshold 26 of the escape route.

Figure 4:
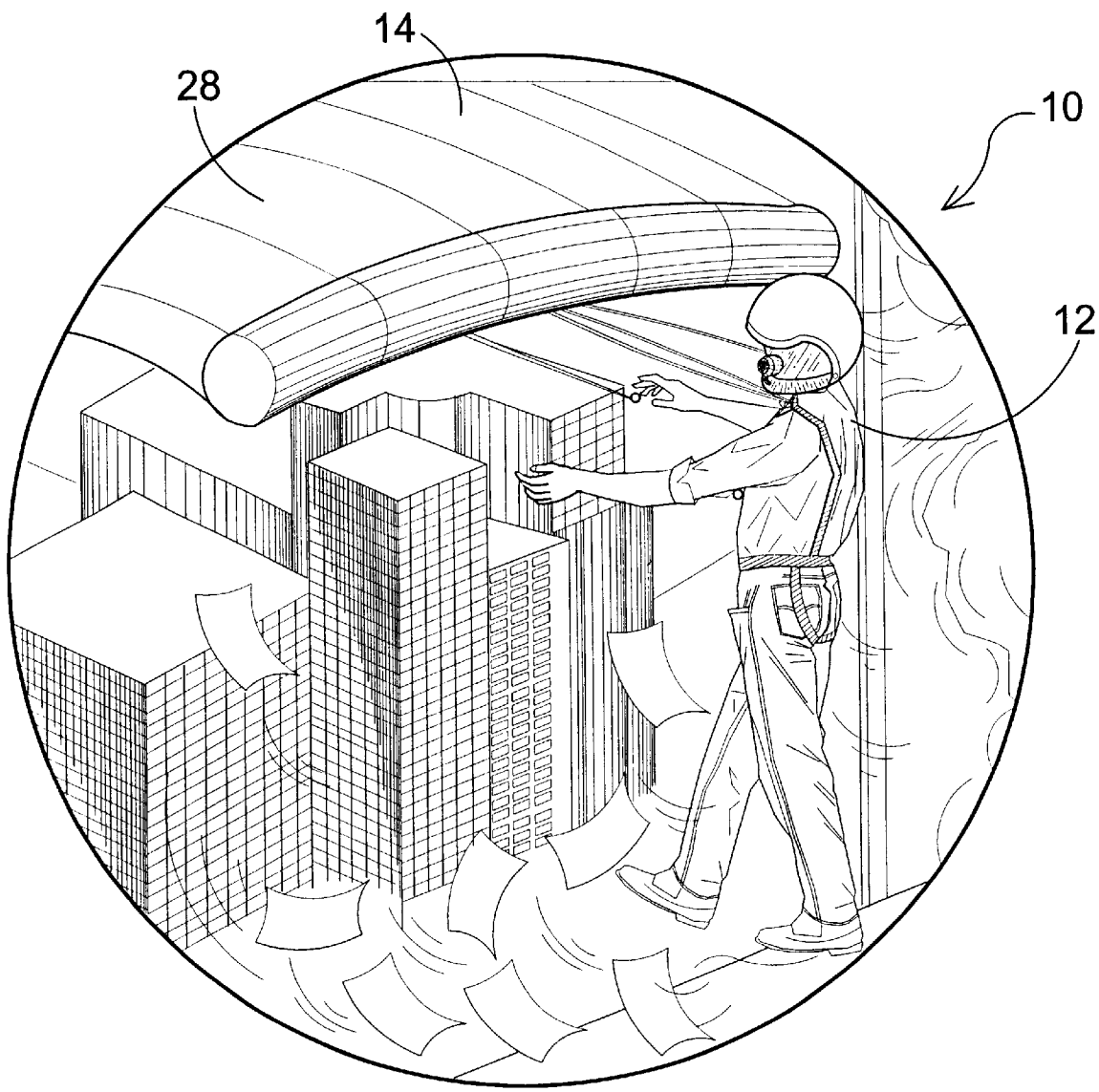
FIG. 4 is an illustrative view of the present invention in use. (Step four)

Turning to FIG. 4, shown therein is an illustrative view of the present invention 10 in use by a user 12. Step four in the use of the present invention 10 is shown. When the parachute 14 is fully open and deployed, the parachute begins to deploy via ambient air filling the parachute canopy 28. The user 12 is then ready to launch themselves.

Figure 5:
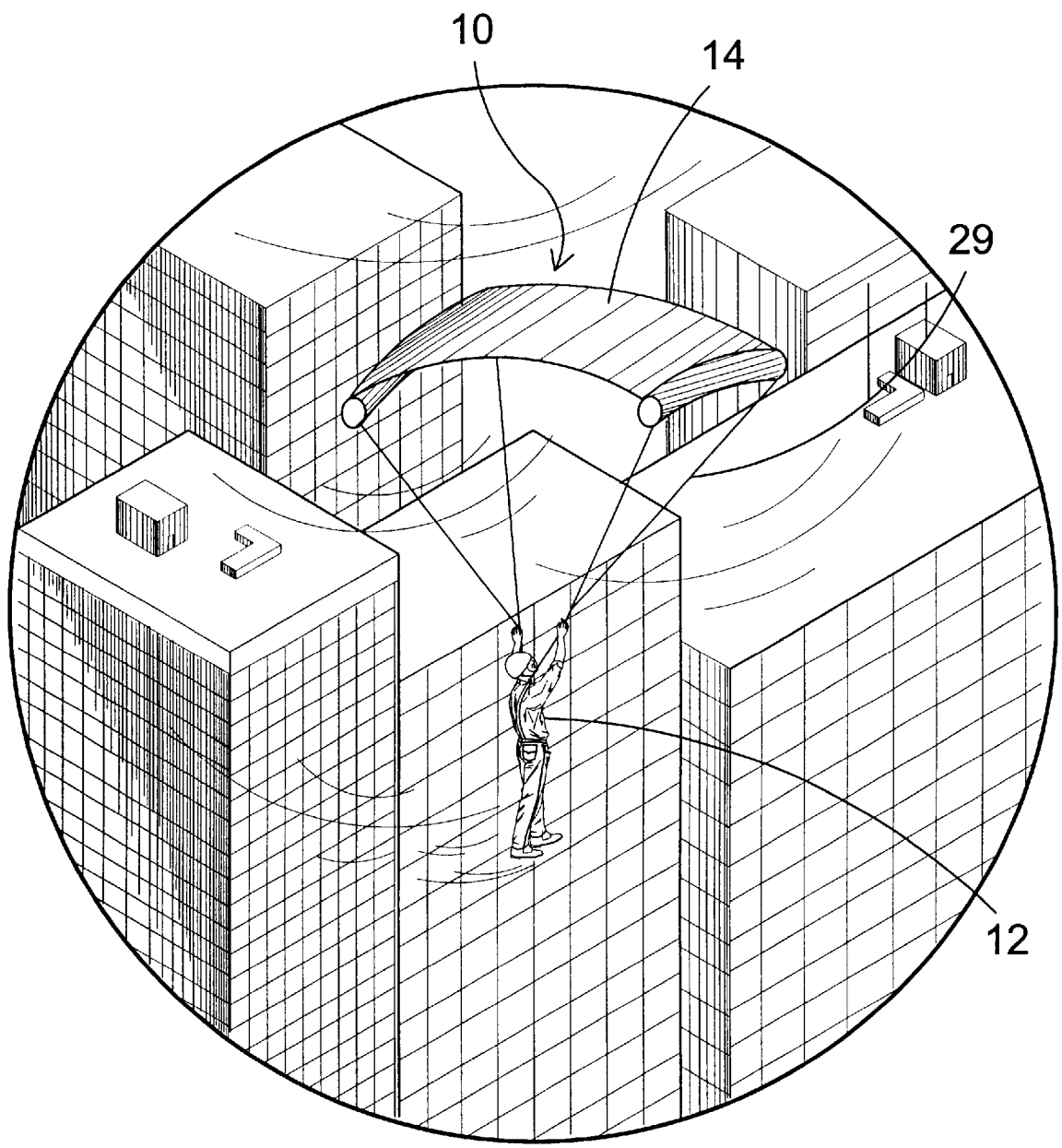
FIG. 5 is an illustrative view of the present invention in use. (Step five)

Turning to FIG. 5, shown therein is an illustrative view of the present invention 10 in use by a user 12. Step five in the use of the present invention 10 is shown. When air borne, the emergency parachute 14 can be controlled in lift, descent, left and right direction by chute lines 29 with flight control rings and straps 34 provided just above the body harness strap.

Figure 6:
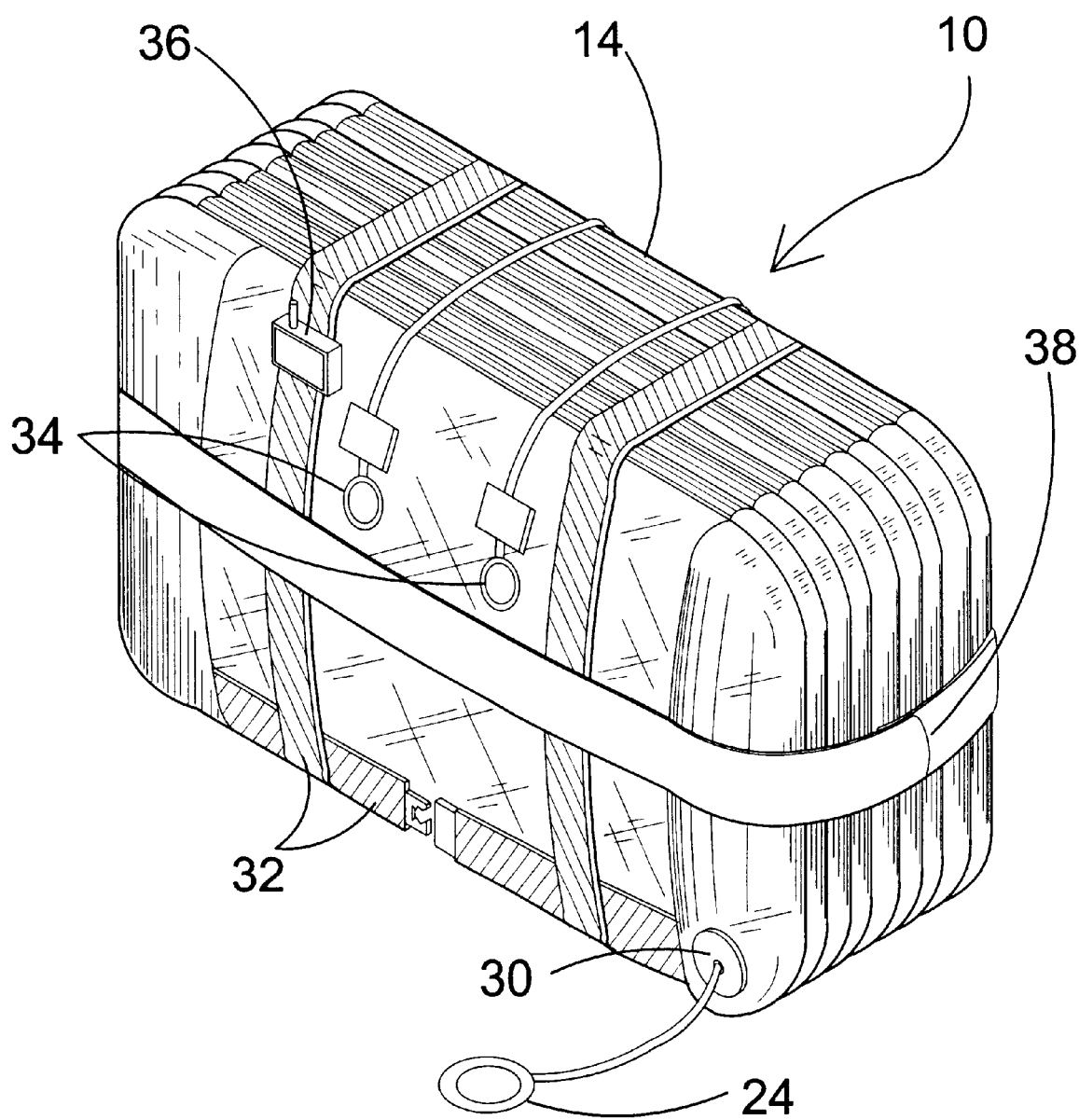
FIG. 6 is a perspective view of the present invention. (Shown undeployed).

Turning to FIG. 6, shown therein is a perspective view of the present invention 10 shown undeployed. The low altitude emergency undeployed parachute 14 of the present invention is a self contained device that is deployed manually by pulling an activation ring 24 and activating a compressed gas canister 30, inflating the canopy pontoons and expanding the canopy of the parachute. The device provides an attachment harness 32 that is secured to the body of the user prior to deployment. Flight control rings and straps 34 are provided to maintain a safe, controlled descent and are located slightly above the shoulder harness. Also shown are an emergency beacon 36 and a breakaway retaining strap 38.

Figure 7:
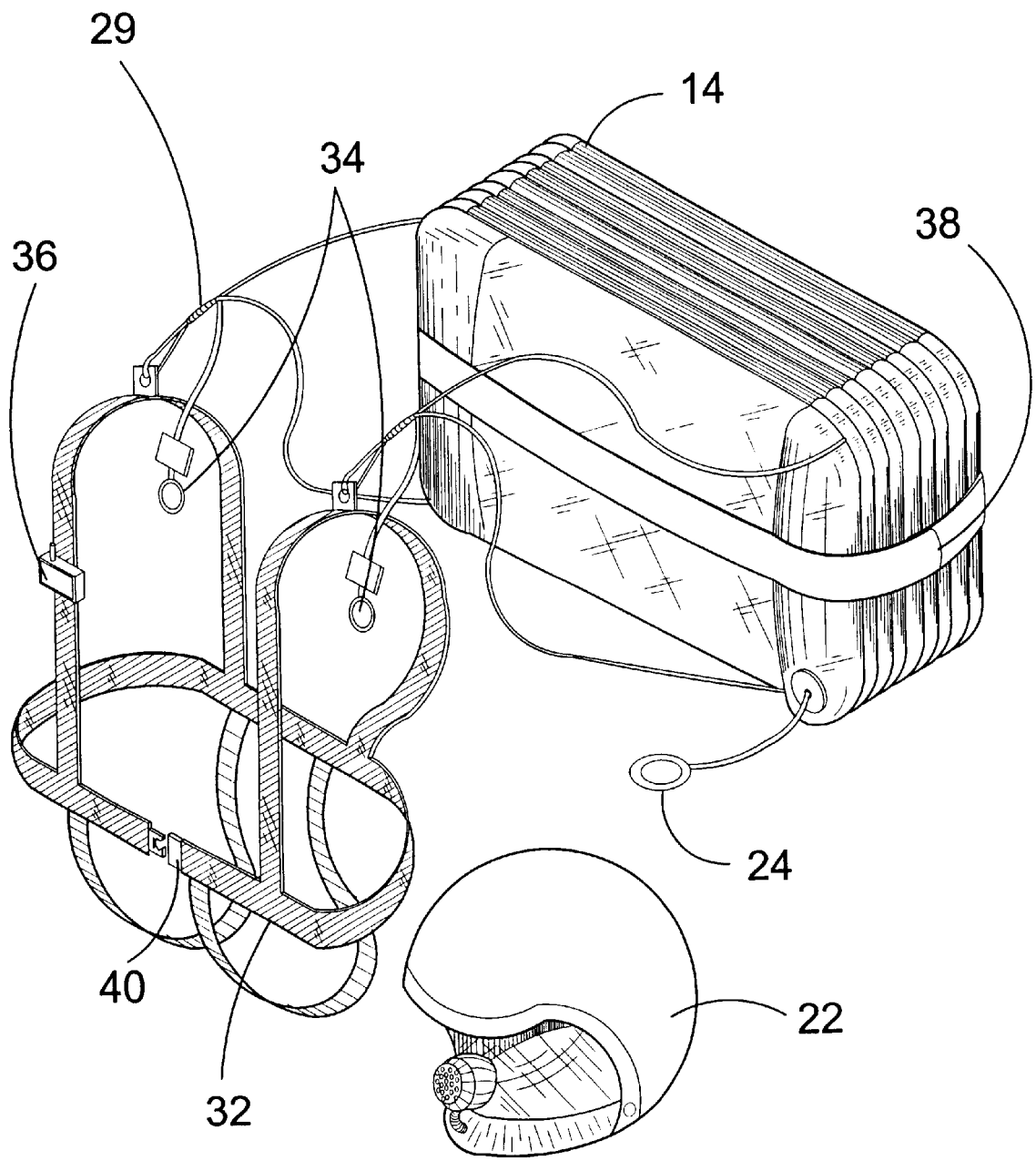
FIG. 7 is a perspective view of the present invention. (With harness removed)

Turning to FIG. 7, shown therein is a perspective view of the present invention 10 with the harness 32 removed. The low altitude emergency parachute 14 of the present invention provides a safety harness 32 with safety buckle 40 that is separated from the undeployed parachute 14 after removing the device from its storage case. The harness 32 is connected to the parachute 14 by chute lines 29 having flight control rings and straps 34 thereon and these remain attached. The user secures the helmet 22 to the head. The user puts the harness 32 on their upper body prior to engaging the activation ring 24 and gas canister 30. Other elements previously disclosed are also shown.

Figure 8:
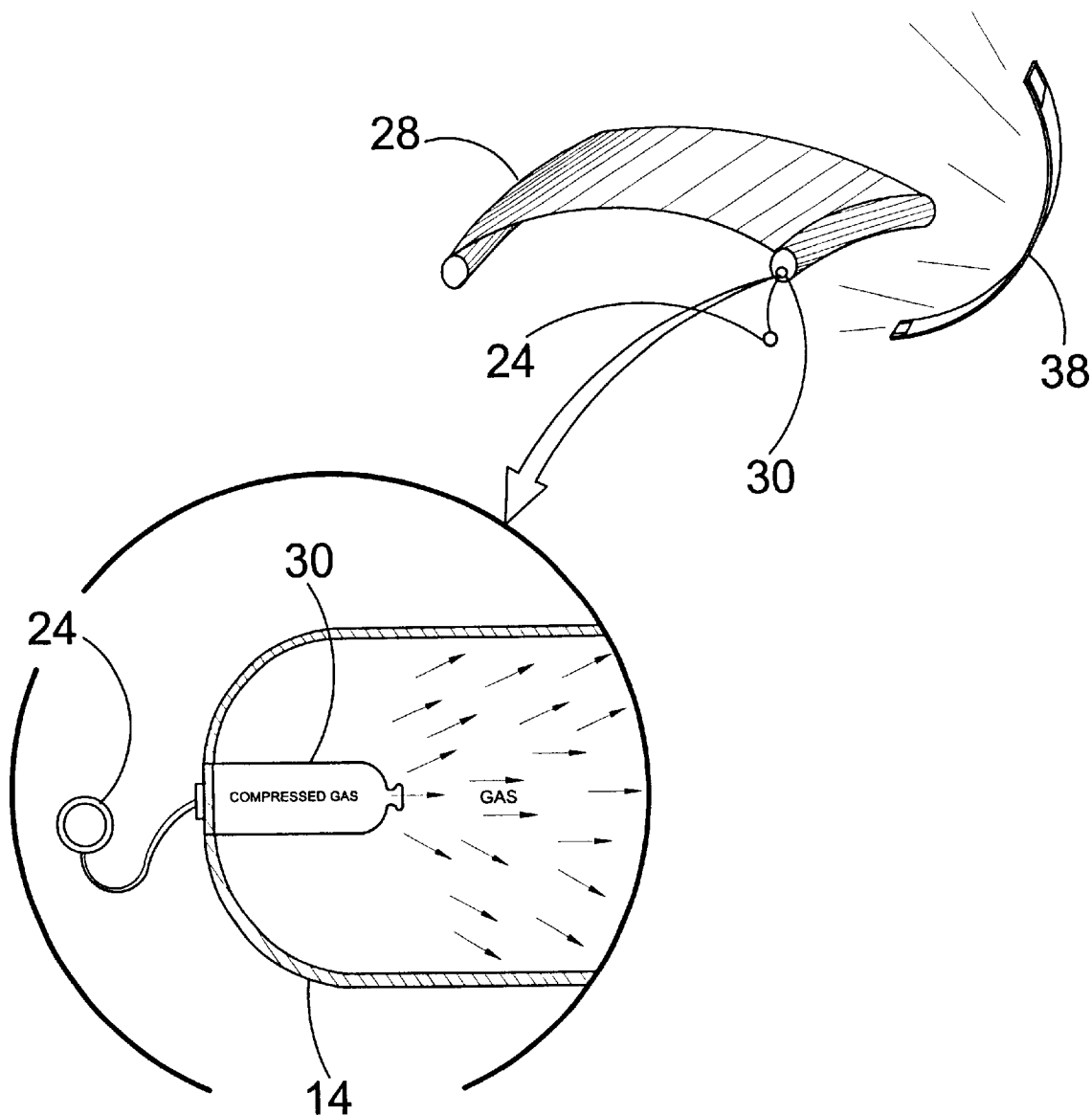
FIG. 8 is a sectional view of the present invention.

Turning to FIG. 8, shown therein is a sectional view of the present invention. Shown are the activation ring 24 pulled and the gas canister 30 deployed and filling the parachute channels with gas, inflating the pontoons and deploying the parachute canopy 28. The breakaway-retaining strap 38 automatically releases from the device as inflation is forced upon it.

Figure 9:
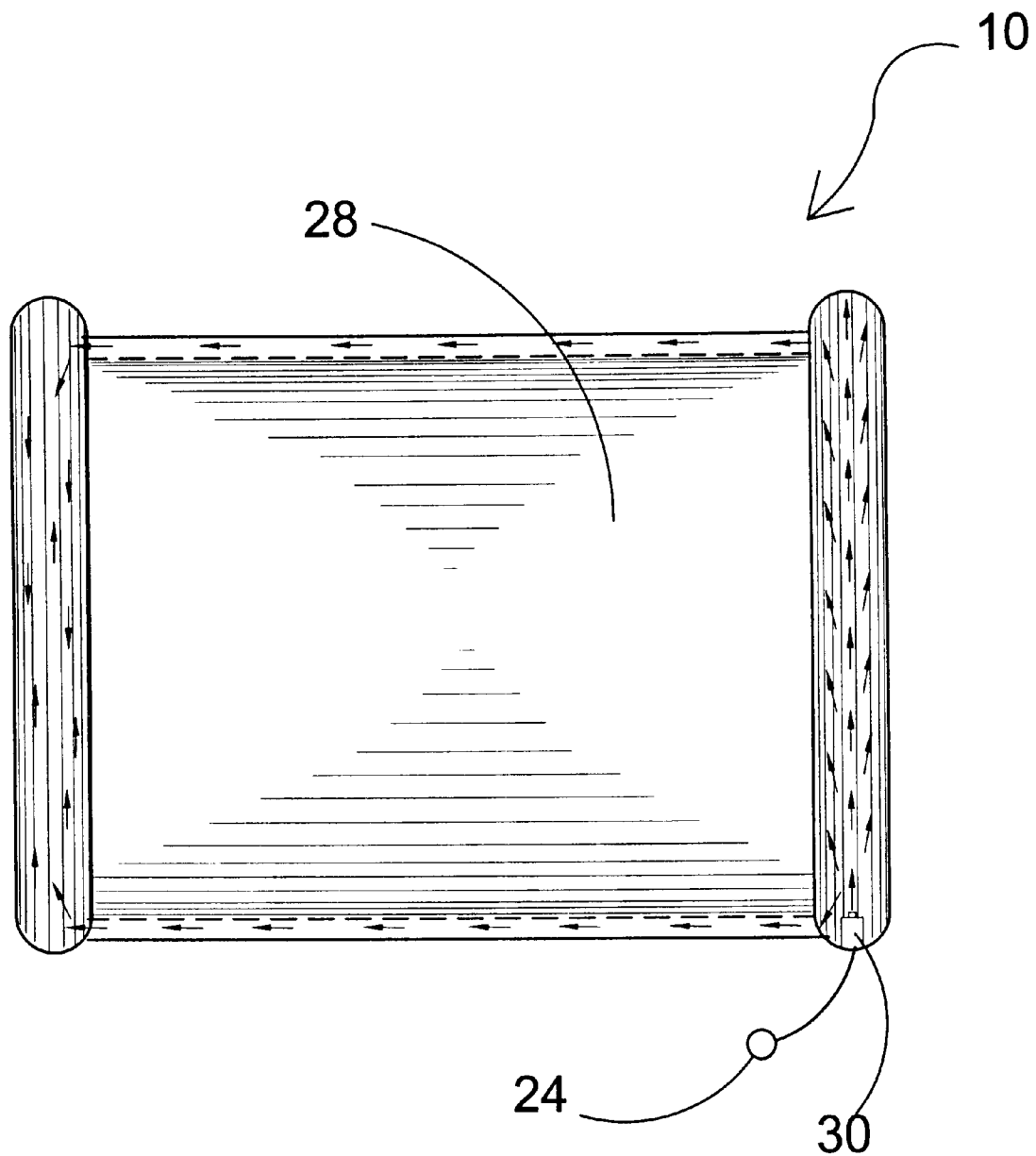
FIG. 9 is top view of the present invention.

Turning to FIG. 9, shown therein is a top view of the present invention 10. Shown are the activation ring 24 pulled and the gas canister 30 deployed and filling the parachute channels with gas, inflating the pontoons and deploying the parachute canopy 28.

What is claimed to be new and desired to be protected by Letters Patent is set forth in the appended claims:

1. A method of using an inflatable, low altitude, emergency parachute to escape a structure, comprising the steps of:
   a) removing the parachute from a parachute carrying case, said parachute comprising a rectangular shaped parachute canopy having a pair of hollow pontoons at opposite ends of said canopy, said pontoons being elongated and parallel to each other, said canopy having passageways in ends adjacent said pontoons for providing communication between said pontoons, a compressed gas canister mounted in one end of one of said pontoons having an activation ring for initiating release of gas from said canister to inflate said pontoons resulting in deployment of said parachute canopy, a harness wrapped around said parachute canopy in a collapsed state, and said harness having chute lines connected to said parachute canopy and straps for attachment to an upper body of a person about to use said parachute;
   b) removing the harness from the collapsed parachute canopy and attaching the parachute harness to the body of the user;
   c) releasing the parachute canopy through a threshold of an escape route of the structure;
   d) filling the pontoons with gas by activating the compressed gas canister; and,
   e) having the user launch himself into flight with the parachute being attached to the user.

2. The method of claim 1, wherein said harness includes a waist strap and a shoulder strap for attachment to the body of the user.

3. The method of claim 2, in which the method includes the step of placing a helmet on the head of a user.

4. The method of claim 3, in which said helmet has a breathing apparatus thereon for the user.

5. The method of claim 4, in which said harness has an emergency beacon.

6. The method of claim 5, in which said chute lines have flight control rings attached to the chute lines of the parachute to permit the user to control the parachute while in flight.

7. A parachute for allowing a person to jump from a low altitude, comprising:
   a) a rectangular shaped parachute canopy having a pair of hollow pontoons at opposite ends of said canopy, said pontoons being elongated and parallel to each other;

b) said canopy having passageways in ends adjacent said pontoons for providing communication between said pontoons;
c) a pressurized gas canister mounted in one end of one of said pontoons having an activation ring for initiating release of gas from said canister to inflate said pontoons resulting in deployment of said parachute canopy;
d) a harness wrapped around said parachute canopy in a collapsed state for providing a portable apparatus; and
e) said harness having chute lines connected to said parachute canopy and straps for attachment to an upper body of a person about to use said parachute, said harness being party of said parachute.

8. The parachute of claim 7 in which said chute lines have flight control rings for use by a user during descent in steering said parachute.

9. The parachute of claim 8 in which said harness comprises a waist strap and shoulder straps for securing the harness to an upper body of the user and an emergency beacon on a shoulder strap.

10. The parachute of claim 9 in which said chute lines comprise a chute line extending to each end of a pontoon, a flight control ring attached to opposite ends of each pair of chute lines connected to one pontoon.

* * * * *